US006150013A

United States Patent [19]
Balaji et al.

[11] Patent Number: 6,150,013

[45] Date of Patent: *Nov. 21, 2000

[54] LOW THERMAL CONDUCTIVITY IN-MOLD LABEL FILMS

[75] Inventors: Ramabhadran Balaji, Painesville; Mark E. Polasky, Willoughby, both of Ohio

[73] Assignee: Avery Dennison Corporation, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,173

[22] Filed: Feb. 23, 1996

[51] Int. Cl.[7] .................... B29C 49/24

[52] U.S. Cl. .................... 428/220; 428/314.2; 428/317.1; 428/317.9; 428/343; 428/349; 428/354; 428/910

[58] Field of Search .................... 428/36.5, 35.7, 428/36.9, 36.92, 40.1, 41.3, 317.1, 317.5, 220, 347, 349, 910, 913, 314.2, 317.9, 319.7, 319.9, 343, 354

[56] References Cited

U.S. PATENT DOCUMENTS

| | | | |
|---|---|---|---|
| 4,264,657 | 4/1981 | Tollette | 428/36.5 |
| 4,377,616 | 3/1983 | Ashcraft et al. | 428/213 |
| 4,528,221 | 7/1985 | Komatsuzaki et al. | 428/36.5 |
| 4,582,752 | 4/1986 | Duncan | 428/317.9 |
| 4,626,455 | 12/1986 | Karabedian | 428/34.7 |
| 4,704,323 | 11/1987 | Duncan et al. | 428/286 |
| 4,713,273 | 12/1987 | Freedman | 428/40 |
| 4,720,416 | 1/1988 | Duncan | 428/195 |
| 4,904,324 | 2/1990 | Heider | 156/214 |
| 4,986,866 | 1/1991 | Ohba et al. | 156/220 |
| 5,079,057 | 1/1992 | Heider | 428/36.5 |
| 5,186,782 | 2/1993 | Freedman | 156/244.11 |
| 5,242,650 | 9/1993 | Rackovan et al. | 264/509 |
| 5,288,648 | 2/1994 | Weber | 428/315.9 |
| 5,405,667 | 4/1995 | Heider | 428/36.5 |
| 5,435,963 | 7/1995 | Rackovan et al. | 264/509 |
| 5,468,527 | 11/1995 | Peiffer et al. | 428/35.7 |
| 5,498,473 | 3/1996 | Williamson | 428/317.3 |
| 5,514,460 | 5/1996 | Surman et al. | 428/304.4 |
| 5,733,615 | 3/1998 | Rackovan et al. | 428/35.7 |
| 5,811,163 | 9/1998 | Ohno et al. | 428/35.7 |

FOREIGN PATENT DOCUMENTS

| | | |
|---|---|---|
| 0369023 | 5/1990 | European Pat. Off. . |
| 470760 | 7/1991 | European Pat. Off. . |
| 545649 | 11/1992 | European Pat. Off. . |
| 559484 | 3/1993 | European Pat. Off. . |
| 58-069015 | 4/1983 | Japan . |

OTHER PUBLICATIONS

Supplementary European Search Report, Application No. EP 97 90 3896, Dec. 21, 1999.

PCT/US97/00965; PCT International Search Report mailed May 13, 1997.

*Primary Examiner*—Rena L. Dye
*Attorney, Agent, or Firm*—Renner, Otto, Boisselle & Sklar

[57] ABSTRACT

The invention is an in-mold label film comprising at least two layers with one layer being a heat seal layer for bonding the film to a polymer substrate wherein the film has a thermal conductivity of less than about $1.250\times10^{-4}$ k-Cal/sec cm ° C. The invention further includes a process for in-mold labeling comprising the steps of forming a label comprising at least two layers with one layer being a heat seal layer for bonding the film to a plastic substrate wherein the film has a thermal conductivity of less than about $1.250\times10^{-4}$ k-cal/sec cm ° C. inserting the label into a mold for producing the plastic substrate with a inside and outside surface thereafter forming a plastic substrate in the mold with sufficient heat wherein the outside surface of the substrate bonds with the heat seal layer of the label.

16 Claims, 1 Drawing Sheet

18 19 21 22 24 24 24 25 26 28 31 32 36 36 39

LOW THERMAL CONDUCTIVITY IN-MOLD LABEL FILMS

INCORPORATION BY REFERENCE

The following patents are herein incorporated by reference: U.S. Pat. Nos. 4,713,273; 5,186,782 and 5,435,963.

BACKGROUND OF THE INVENTION

1. Field of the Invention

The invention is an in-mold label film with low thermal conductivity. The invention is further the use of these in-mold label films in both large area label applications, and to decrease the mold residence time for in-mold processes. The invention still further is the processes for the manufacture of these in-mold films and labels.

2. Technology Review

It has been know for a number of years to manufacture and distribute polymer films for the use as facestock in labels. When a plastic container such as a polyethylene squeeze bottle is used to package a product such as a hair shampoo, a package using a polymeric label is generally more appealing to consumers than a package using a paper label. In many applications the use of polymeric labels is required for reasons of appearance, handling, performance, moisture-resistance, conformability, durability and compatibility with the container to be labeled.

In-mold labelling has significant advantages over methods commonly used in the past to label plastic containers with polymeric labels. The most common of these previous methods involve the use of liner-carried pressure sensitive adhesive labels, or liner carried heat activatable adhesive labels. To produce the liner carried labels, a laminating step is performed to sandwich a layer of adhesive between a web of label stock and a web of silicone-coated paper which is to function as a carrier or release liner, the label stock is printed, the ink is dried by heating elements or ultraviolet radiation, separate labels are cut from the label stock by passing the combination through a rotary-die or flat-bed cutting station, and the matrix of waste or trim label stock surrounding the labels is stripped and discarded or recycled. What remains is a succession of individual labels releasably carried on the release liner. Use of these types of methods results in high costs due to the use of a release liner, and the ecological difficulties in disposing of the liner and the trim.

In contrast, in-mold labeling avoids the use of any release liner or carrier. During in-mold labelling with polymeric labels, self-supported or free-film polymeric label stock is combined with heat-activatable adhesive, printed, die-cut and then arranged for deployment, as by being magazine-loaded as a series or stack of linerless labels, or by other means. The polymeric labels are then sequentially deployed on the molding surface of a blow mold to be bonded onto successive hot plastic substrates or containers. The blow molded parisons are expanded against the molding surface and the in-mold label which activates and bonds the heat-activatable adhesive to the blown plastic substrate or container.

Despite the advantages of in-mold labeling over liner-carried labelling, the commercially successful accomplishment of in-mold labelling with polymeric labels has been inhibited by a problem that was not encountered with either liner-carried labelling with polymeric labels or in-mold labelling using paper labels. This problem was the unacceptable quality of the bond between the plastic substrate or container and the label film, and the further difficulties experienced in large area label applications involving unacceptable blistering and peeling of these label films.

SUMMARY OF THE INVENTION

The present invention overcomes the problem discussed above. The invention contemplates an in-mold label film comprising at least two layers with one layer being a heat seal layer for bonding the film to a polymer substrate wherein the film has a thermal conductivity of less than about $1.250\times10^{-4}$ k-Cal/sec cm ° C. The present invention further includes a process for in-mold labeling comprising the steps of forming a label comprising at least two layers with one layer being a heat seal layer for bonding the film to a plastic substrate wherein the film has a thermal conductivity of less than about $1.250\times10^{-4}$ K-cal/sec cm ° C. inserting the label into a mold for producing the plastic substrate with an inside and outside surface thereafter forming a plastic substrate in the mold with sufficient heat wherein the outside surface of the substrate bonds with the heat seal layer of the label.

DETAILED DESCRIPTION OF THE INVENTION

Figure 1:
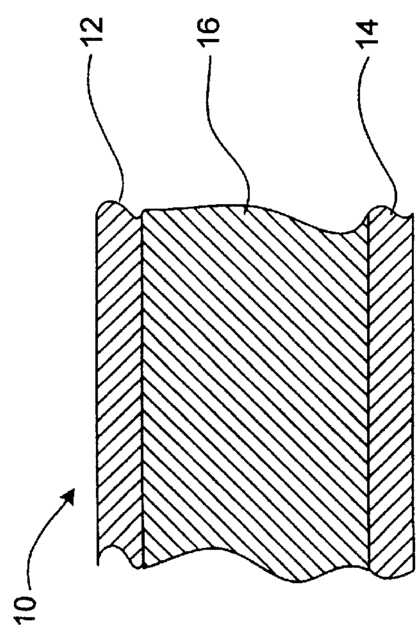
FIG. 1 is one illustration of a film facestock embodying the invention.

The present invention is an in-mold label film comprising at least two layers with one layer being a heat seal layer for bonding the film to a polymer substrate wherein the film has a thermal conductivity of less than about $1.250\times10^{-4}$ k-Cal/sec cm ° C. Preferably, the thermal conductivity of the film is less than about $1.200\times10^{-4}$ k-Cal/sec cm ° C., still preferably the thermal conductivity of the film is less than about $1.108\times10^{-4}$ k-Cal/sec cm ° C., more preferably the thermal conductivity of the film is less than about $1.000\times10^{-4}$ k-Cal/sec cm ° C., still more preferably the thermal conductivity of the film is less than about $0.913\times10^{-4}$ k-Cal/sec cm ° C., and most preferably the thermal conductivity of the film is less than about $0.825\times10^{-4}$ k-Cal/sec cm ° C.

The film of the present invention contains two or more layers. For purposes of this application a two layer film contains a base layer and a heat seal layer, and a film with three or more layers contains a print skin layer, a heat seal layer and a core which is made of one or more layers. Preferably, the film contains three layers. Preferably, in either case, however, the base layer or the core acts as an insulating layer. More preferably, the insulating layer(s) is adjacent to the heat seal layer.

The heat seal layer is a layer which is activated by heat to allow the label to bond to a plastic substrate. Materials for the heat seal layer for in-molds label include but are not limited to the following film-forming materials used alone or in combination such as polyethylene, metallocene catalyzed polyolefins, syndiotactic polystyrene, syndiotactic polypropylene, cyclic polyolefins, polyethylene methyl acrylic acid, polyethylene ethyl acrylate, polyethylene methyl acrylate, acrylonitrile butadiene styrene polymer, polyethylene vinyl alcohol, polyethylene vinyl acetate, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, and thermoplastic polyesters. Preferably, PE is used in the heat seal, more preferably, a blend of PE and EVA, and most preferably, a blend of PE and EVA with special antiblock and antistatic additives. Also, thin layer has antiblock additives (such as silica, diatomaceous earth, synthetic silica, glass spheres, ceramic partides, etc.) This layer also has an antistatic additive (such as an amine or an amide or a derivative of a fatty acid).

The heat seal layer is designed for and activated at temperatures known to those skilled in the art. While the heat seal layer may activate at temperatures below those specified for activation, the heat seal layer is designed to activate at certain temperatures based on the substrate material under normal in-mold labeling conditions. Preferably, the heat seal layer activates at temperatures between about 57° C. to about 100° C., more preferably the heat seal layer activates at temperatures between about 57° C. to about 80° C., and most preferably the heat seal layer activates at temperatures between about 57° C. to about 70° C.

Preferably, the in-mold label has a skin or print layer. The skin or print layer is developed for its appearance and printing characteristics. Materials for the skin or print layer for in-mold labels include but are not limited to the following film forming materials used alone or in combination such as polyethylene, metallocene catalyzed polyolefins, syndiotactic polystyrene, syndiotactic polypropylene, cyclic polyolefins, polyethylene methyl acrylic acid, polyethylene ethyl acrylate, polyethylene methyl acrylate, acrylonitrile butadiene styrene polymer, polyethylene vinyl alcohol, polyethylene vinyl acetate, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, and thermoplastic polyesters. Preferably, polypropylene is used in the skin layer (or layers) and more preferably a mixture of ethylene vinyl acetate/polypropylene is used.

In order to achieve the low thermal conductivity's described above, preferably the film is voided. Voided films can be produced by the use of blowing agents in the polymer film materials, or by the orientation of an incompatible two phase system. More preferably, the film is produced by the orientation of an incompatible two phase system. Oriented incompatible two phase systems can either be uniaxially oriented or biaxially oriented. Most preferably, the film is uniaxially oriented.

While each of the layers of the film including the skins may contain voids, preferably, the skin layer and/or the heat seal layers contain essentially no voids. Essentially no voids preferably means that the skin layers contain less than about 10% by volume of voids, and more preferably less than about 3% by volume of voids. Preferably, one of the layers of the core contains voids, and more preferably the entire core contains voids.

The selection of materials for the skin layer, heat seal layer, base layer and those layers of the core containing essentially no voids is dependent on the application of the film. The selection of materials for the voided layer or layers is further dependent on the void initiating particle or phase materials and on the process conditions necessary for creating the voids.

As mentioned above, the core or base layers are preferably insulating. The insulating characteristics can be brought about by either using materials with an inherently low thermal conductivity or by voiding the layer(s) of the core or base. Preferably the core or base contain voided layers.

Materials for the voided layer (or layers) and those essentially non-voided layers in the core or the base layer include but are not limited to meltable film-forming substances used alone or in combination such as polyethylene, polyethylene methyl acrylic acid, polyethylene ethyl acrylate, metallocene catalyzed polyolefins, syndiotactic polystyrene, syndiotactic polypropylene, cyclic olefins, polyethylene methyl acrylate, acrylonitrile, butadiene styrene polymer, polyethylene vinyl alcohol, polyethylene vinyl acetate, nylon, polybutylene, polystyrene, polyurethane, polysulfone, polyvinylidene chloride, polypropylene, polycarbonate, polymethyl pentene, styrene maleic anhydride polymer, styrene acrylonitrile polymer, ionomers based on sodium or zinc salts of ethylene/methacrylic acid, polymethyl methacrylates, cellulosics, fluoroplastics, polyacrylonitriles, polybutylene terephthalate (PBT), polyethylene terephthalate (PET) and thermoplastic polyesters.

The film can be manufactured by those processes known to those in the art such as casting, coating or extrusion. The films are, however, preferably manufactured by a polymer extrusion or coextrusion process. The extrudate or coextrudate of polymeric film materials is formed by simultaneous extrusion from a suitable known type of extrusion or coextrusion die, and in the case of the coextrudate the layers are adhered to each other in a permanently combined state to provide a unitary coextrudate. A tie layer can be used when the materials of the layer (or layers) of the core, or materials of the core and the skin layer (or layers) do not sufficiently adhere or bond to each other when they are extruded together. Preferably, the film is coextruded. Care, however, must be taken to prevent activation of the heat seal layer during the coextrusion process.

The cast or extruded film in the core layer (or layers) formed from the incompatible two phase system is then either biaxially or uniaxially oriented. The means for orienting the film includes but is not limited to cold stretching, hot stretching, compression rolling, hot compression rolling, and a blown extrusion process. Preferably the film is uniaxially oriented and/or preferably the material is hot stretched. If the film will have an application with further processing or service temperatures above room temperature, preferably the film is also heat set or annealed to provide for dimensional stability, i.e., to prevent shrinking, relaxing or any distortion of the film. Preferably, the film thickness is less than about 7 mils. More preferably, the film thickness is from about 3 mil to about 7 mil. Most preferably, the film thickness is from about 4 mil to about 6 mil.

For purposes of this invention, the preferable incompatible two phase systems for voiding can be either uniaxially or biaxially oriented. For purposes of this specification, uniaxial orientation means the film is oriented substantially in the direction of orientation and to a lesser degree in the relatively unoriented direction. This preferably means that the stiffness is the oriented direction (machine direction for extruded films) is greater than about 10 Gurley, and that the stiffness in the unoriented direction (cross direction for extruded films) is less than about 0.75 times the stiffness in the oriented direction. Still preferably the stiffness in the unoriented direction is less than about 0.6 times the stiffness in the oriented direction, more preferably less than about 0.5 times, and most preferably less than about 0.4 times.

For an incompatible two phase system, the void initiating particle or phase material, as indicated above, should be, at least partially, incompatible with the core material, at least at the conditions of uniaxial orientation. Typical void initiating particles materials can be organic or inorganic. Examples of organic void initiating particles include but are not limited to polyamides; nylons; high density polyethylenes; polyesters such as polyethylene terephthalate; acetals; polypropylene homopolymer; and acrylic resins. Examples of inorganic void initiating particles include but are not limited to solid and hollow preformed glass spheres, metal beads or spheres; ceramic particles; titanium dioxide; calcium carbonate; barium sulfate; chalk; silicon dioxide; and clay. The preferable inorganic void initiating particle materials are mica, clay and chalk; more preferable material is ceramic spheres; and the most preferable material is calcium carbonate. The preferred mean particle size of the void initiating particle or phase is from about 0.1 to about 12$\mu$. The more preferred mean particle size of the void initiating particle or phase is from about 0.5$\mu$ to about 5$\mu$. The most preferred mean particle size of the void initiating particle or phase is from about 1 to about 3$\mu$.

The void initiating particles can be of most any shape, i.e. spherical or nonspherical. Examples of non-spherical shapes of the void initiating particles include but are not limited to acicular (needle shaped), angular (sharply edged or roughly polyhedral), dendritic (of branched shape), fibrous (having the appearance of regularly or irregularly shaped threads), flaky (plate like), granular (approximately equidimensional but of irregular shape), irregular (lacking any symmetry), nodular (of rounded irregular shape), conical, and hemispherical. The preferable particle shape is non-spherical. The more preferable particle shape is conical.

As indicated above, certain low cost filler materials such as calcium carbonate can be used as void initiating particles. Therefore, the greater the amount of void initiating particle, the lower the cost of materials in the film. Preferably, the void initiating particles or phase is present in an amount greater than about 30 weight percent of the voided layer prior to orientation. More preferably, the void initiating particles or phase is present in an amount greater than about 35 weight percent of the voided layer prior to orientation. Most preferably, the void initiating particles or phase is present in an amount greater than about 40 weight percent of the voided layer prior to orientation.

The voided film layer is generally described as being a matrix material within which is located a strata of voids. From this it is to be understood that the voids create the matrix configuration. The term "strata" is intended to convey the understanding that there are a large number of voids creating the matrix and the voids are oriented so that the major dimension(s) of the void is preferably aligned in correspondence with the direction(s) of orientation of the polymeric film structure. After each void has been formed through the initiation of a particle, the particle may contribute little else to the system. This is because the thermal conductivity of the void initiating particle or phase is general the same or greater than that of the polymer matrix.

A typical void in the film layer preferably is defined by having a major dimension in the oriented direction(s) (X dimension for uniaxially oriented films, and X and Y dimensions for biaxially oriented films) with the minor dimension (s) in the non-oriented or cross direction (Y dimension for uniaxially oriented films) and in the Z dimension which corresponds to film or layer thickness.

It is preferable that the orientation conditions be such that the void is initiated and that the general integrity of the voids through growth is maintained. By this it is meant that during orientation which produces the X dimension, the temperature conditions must be such as to permit this dimension(s) to form with little or no any destruction of the voids in any of their dimensions. This has the following benefits. Closed cells tend to be a vacuum with little or no conductive gases which tend to give the cell this vacuum effect which enhances thermal conductivity. Further, closed cells reduce the water and/or oxygen transmission across the film. Preferably the majority of voids are closed cells without essentially any destruction of those voids considered to be closed cells. Still preferably, greater than about 60 percent of the voids are closed cells. More preferably, greater than about 70 percent of the voids are closed cells. Still more preferably, greater than about 80 percent of the voids are closed cells. Most preferably, greater than about 90 percent of the voids are closed cells.

As referred to above, the matrix polymer, copolymer or blends thereof and the void initiating particle or phase must be incompatible. This term is used in the sense that the materials are two distinct phases. The void initiating particles or phase constitute a dispersed phase throughout a matrix which is preferably a lower melting material. The material upon orientation will become void filled with the void initiating particles positioned somewhere in the void.

As a result of the voiding of the films structure described herein, in addition to the increased thermal conductivity, the orientation and voids improves other physical properties of the composite layers such as opacity, crack resistance, tear strength, elongation, tensile strength and impact strength. When the voided film layer is combined with surface or skin layers, the resulting film can have a smooth high quality appearance with unexpectedly improved thermal conductivity, and water vapor transmission and/or low oxygen transmission rate characteristics. This makes the film ideally suited for in-mold labeling.

Figure 2:
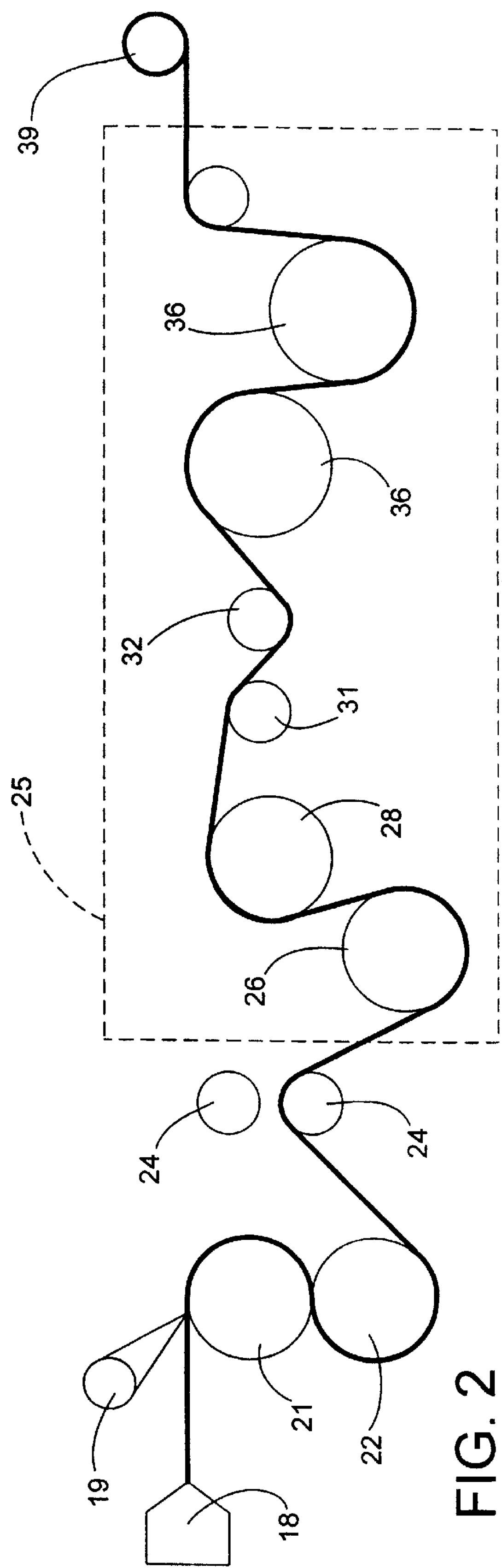
FIG. 2 is a sketch illustrating the steps of coextruding, hot-stretching and annealing used in the method of the invention.

In one of the preferred embodiments, the film 10 shown in FIG. 1 is a coextrusion consisting of a core 16 , a heat seal layer 12 and a skin layer 14. The charges for the several layers are prepared for extrusion through the multifeed coextrusion die 18 as illustrated in FIG. 2.

In this embodiment, the hot stretching is performed at a temperature equal to or above the softening temperature of the film and provides film orientation. During hot stretching the extrusion or coextrusion die is preferably maintained between from about 190° C. to about 215° C., and more preferably at about 205° C. The extruded film is cast onto a casting roll 21 which is preferably maintained between from about 20° C. to about 50° C., and more preferably at about 38° C., and is provided with an air knife 19. The film continues around the casting roll 21 and then passes to the chill roll 22 which is preferably maintained from about 20° C. to about 50° C., and more preferably at about 38° C. The film continues around the chill roll, trains through the rolls 24, and enters the uniaxial (or machine) direction orientation unit (MDO) 25. The film is preferably moved at a rate of between from about 8 to about 13 feet per minute past all these rolls, and more preferably at about 8 feet per minute.

Within the MDO unit, the film is stretched and stiffened in the machine direction. The film is passed around a first pre-heat roll 26 and then around a second pre-heat roll 28. Both of these rolls are maintained at between from about 90° to about 120° C., and more preferably at about 107° C., and at this point the film continues to move at between from about 8 to about 13 feet per minute, and more preferably at about 8 feet per minute. After leaving the second pre-heat roll the film tracks on the slow draw roll 31 still preferably moving at between from about 8 to about 13 feet per minute, and more preferably moving at about 8 feet per minute. The film is then pulled to the fast draw roll 32 which preferably advances the stock at the rate of between from about 56 to about 91 feet per minute, and more preferably at about 56 feet per minute. Therefore in this particular preferred embodiment described, the film is stretched sevenfold and is drawn down preferably to about 20% of its original thickness. Stretch ratios are preferably from about 4:1 to about 10:1, and more preferably are from about 5:1 to about 7:1.

In this particular embodiment, the film continues on its way preferably at a rate between from about 56 to about 91 feet per minute, and more preferably at a rate of about 56 feet per minute. As it leaves the pull-roll pair 31, 32, the stretched film is subject to severe shrinkage if it is heated while under little or no mechanical constraint. The polymer film is said to have a "memory" of its original length to which it tends to return when heated. The film is cured or annealed to remove this tendency by applying heat to the tensioned film at the annealing roll 36 which in this embodiment is preferably maintained between from about 115° C. to about 140° C., and more preferably at about 125° C. The film then passes directly to the chill roll 38. The roll 38 is preferably maintained at a temperature between from about 35° C. to about 60° C., and more preferably at about 50° C. After leaving the chill roll 38 at the completion of the hot stretch operation, the film may be taken up as a self-wound roll 39. The roll 39 may be conveniently transported and stored.

The present invention further includes a process for in-mold labeling comprising the steps of forming a label comprising at least two layers with one layer being a heat seal layer for bonding the film to a plastic substrate wherein the film has a thermal conductivity of less than about $1.250\times10^{-4}$ k-cal/sec cm ° C. as described above; inserting the label into a mold for producing the plastic substrate with a inside and outside surface thereafter forming a plastic substrate in the mold with sufficient heat wherein the outside surface of the substrate bonds with the heat seal layer of the label.

The heat seal layer can be coated onto the core by conventional coating processes or preferably can be coextruded with the film in the form of a heat seal layer. Preferably, the heat seal layer is tailored to be heat sensitive. The film material is printed then die or laser cut. The printed and cut label is placed inside the mold cavity during the molding process for producing a plastic container with the adhesive side facing the outside surface of the hot plastic container. As the plastic is molded, the heat activates or melts the adhesive on the label, and the label and the plastic container form a permanent bond.

Whether an in-mold label bonds to a container during the molding process without any problems is dependent upon many properties of the label material. One of these key properties is the insulative properties of the label and more particularly of the base or core. This becomes more and more important as the label size increases. That is because as the label comes into contact with the plastic container the heat generated from the container is used to activate or melt the heat seal layer of the label. If the base or core does not insulate the heat seal or adhesive layer, the labels tend to adhere poorly to the plastic container and may not adhere at all at certain locations. As the container cools down this tends to create bubbles or blisters in the label which are aesthetically unpleasing. Therefore , a label made of a film consisting a low thermal conductivity in the core or base layer is necessary for the proper application of in-mold labels on large size containers.

A further advantage of the in-mold label of the present invention is the potentially reduced cycle times for the in-mold manufacturing of labeled containers. The reduced cycle times are attributable to a decrease in the residence time in the mold which is necessary to activate the heat seal layer upon contact with the container. This is due to the insulating properties of the film and in particular core which results in a quicker activation of the heat seal due to quicker heat buildup in the heat seal layer. This further results in less destruction of both the insulating layer(s) and those layers removed from the heat seal layer by the insulating layer.

In order that persons in the art may better understand the practice of the present invention, the following Examples are provided by way of illustration, and not by way of limitation. Additional background information known in the art may be found in the references and patents cited herein, which are hereby incorporated by reference.

EXAMPLES

Example 1–18

These examples are samples of film typically used as in-mold labels. For in-mold labeling this film would typically be converted into labeling for application onto plastic containers during the process of forming these containers. Examples 1–18 were all three layer films containing a core and two skins which were produced by a coextrusion process. One skin is the print skin and the other skin a seal layer for bonding the label to the plastic container during the in-mold process.

Table I shows the composition of the core by weight percent of components. HPP was a homopolymer polypropylene sold by Union Carbide Corporation of Houston, Tex., under the product number 5A97. The 5A97 product has the following characteristics: a melt flow index of 3.9 grams/10 minutes; a melting point of 162° C.; tensile strength at yield of 5350 psi; elongation at tensile yield of 8%; and a flexural modulus (1% secant) of 230,000 psi. The RnCopp was a random copolymer polypropylene was sold by Union Carbide Corporation of Houston, Tex., under the product name 6D20. The 6D20 random copolymer polypropylene has the following characteristics: a melt flow of 1.6–2.2 grams/10 minutes; a density of 0.890 grams/cc; a tensile yield strength of 3600 psi; a yield elongation of 14%; a flexural modulus (tangent) of 130,000 psi; a vicat softening temperature of 134° C.; and a melting temperature of 147° C. The CaCO3 is a concentrate of the void initiating particle and HPP with the following characteristics: the composition is polypropylene with 40 weight percent calcium carbonate mineral filler; the material has a melt index of 3.0 minimum to 6.0 maximum (ASTM D1238); ash of 40.0+/−2.0%; volatiles of 500 ppm max.; and a bulk density of 730+/−50 g/l. The calcium carbonate concentration is sold by A. Schulman, Inc. of Akron, Ohio under the product name Polybatch PF92D. EVA is ethylene vinyl acetate and is sold by Quantum Chemical Corporation of Cincinnati, Ohio under the product name Ultrathene UE 631-04. The EVA material is a material which promotes higher temperature performance as well as adhesion to a variety of substrates. Ultrathene UE 631-04 contains a stabilizing additive package and can also be used in compounded products where high filler loadings are required. The EVA material has the following properties: melt index 2.4 g/10 min.; tensile strength at break of 2150 psi; elongation at break of 710 percent; a 1% secant modulus of 5300 psi; a hardness (shore A) of 87; a ring & ball softening point of 174° C.; and a peak melting point of 86° C.

The print skin layer of the three layer film consists of 50 weight percent EVA (described above) and 50 weight percent HPP (described above) was melted and mixed in a 1¼ inch extruder equipped with a screw of a L/D ratio of 24:1. This extruder was manufactured by Davis Standard of Pawcatuck, Conn. The extruder contained three temperature zones which where maintained during melting and mixing at 205, 210 and 216° C. respectively.

The core of the films of the compositions described above (see also Table I) was melted and mixed in a 2½ inch extruder equipped with a screw of a L/D ratio of 28:1. This extruder was manufactured by Davis Standard of Pawcatuck, Conn. The extruder contained four temperature zones which were maintained during melting and mixing at 216, 221, 227 and 232° C. The calcium carbonate of the core material was dried prior to mixing in an oven manufactured by Conair Franklin of Franklin, Pa. at 80° C. for four hours to insure that the concentrate material contains little or no moisture.

TABLE I

| | Composition of the Core Weight Percent | | | |
|---|---|---|---|---|
| Examples | HPP | RnCopp | CaCO3 | EVA |
| 1 | 75 | | 25 | |
| 2 | 50 | | 50 | |
| 3 | 60 | | 40 | |
| 4 | 45 | 15 | 40 | |
| 5 | 30 | 30 | 40 | |
| 6 | 15 | 45 | 40 | |
| 7 | 55 | | 45 | |
| 8 | 25 | 25 | 50 | |
| 9 | 23 | 23 | 50 | 4 |
| 10 | 17.5 | 17.5 | 50 | 15 |
| 11 | | 50 | 50 | |
| 12 | 25 | | 75 | |
| 13 | 35 | | 65 | |
| 14 | 23 | | 73 | 4 |
| 15 | 18 | | 78 | 4 |
| 16 | | | 96 | 4 |
| 17 | 23 | 23 | 50 | 4 |
| 18 | 23 | 23 | 50 | 4 |

The heat seal layer consisted of 40 weight percent EVA (described above); 37.5 weight percent low density polyethylene; 20 weight percent of an antiblock concentrate; and 2.5 weight percent of an antistatic concentrate. The low density polyethylene was manufactured by Rexene Products of Dallas, Tex. under the product name LD Polyethylene PE 1017. The low density polyethylene material has good impact strength, heat seal and foaming characteristics. The LD Polyethylene PE 1017 has the following material properties (which are based on its product data sheet): melt index of 2.0 grams/10 minutes; density of 0.930 grams/cc; tensile strength at break of 1600 psi; a vicat softening point of 94° C.; an elongation at break of 500 percent; a secant modulus of 32000 psi; and a shore D hardness of 50. The antiblock concentrate was manufactured by A. Schulman Inc. of Akron, OH under the product name Polybatch F-20. The Polybatch F-20 is an antiblock concentrate containing 20 weight percent natural silica based in low density polyethylene, and is designed for use in polyethylene applications. Both the particle size and the dispersion of this antiblock have been optimized to offer effective coefficient of friction values when used in conjunction with standard slip concentrates. The Polybatch F-20 material has the following material properties (which are based on its technical data sheet): melt index of the carrier resin of 9+/−4 grams/10 minutes; melt index of concentrate of 7+/−3 grams/10 minutes; ash (percent natural silica) of 20+/−2 percent; moisture retention (Karl fisher@190° C.) of 1000 ppm maximum; and pellets per gram of 46+/−5. The antistatic concentrate was also manufactured by A. Schulman Inc. of Akron, Ohio under the product name Polybatch VLA SF. Polybatch VLA SF is a specialty antistatic concentrate. The Polybatch VLA SF material has the following material properties (which are based on its technical data sheet): melt index of the concentrate of 11–18 grams/10 minutes; and moisture retention (Karl Fisher@190° C.) of 1000 ppm maximum.

The materials for the heat seal layer were melted and mixed in a 1-¼ inch extruder manufactured by Davis Standard of Pawcatuck, Conn. with a screw of a L/D ratio of 24:1. The extruder contained three temperature zones which were maintained at 205, 210 and 216° C. respectively.

The three extruders feed a multilayer feedblock which then feeds a single manifold coathanger die. Both the feedblock, die and adapter pieces which connected the extruders, feedblock and die together were held at a constant temperature of 210° C. The three layer film was extruded onto a casting roll which is maintained at 38° C., and was provided with an air knife for further cooling the film. The film was then stretched uniaxially in the machine direction by being run through an orientation unit which orients the film in the machine direction (MD). The orientation unit consisted of a number of rolls the first of which were used for pre-heating the film prior to stretching. These rolls were maintained at 107° C. so that a substantial portion of the thickness of the film is heated. The film is stretched between the slow draw roll (moving the film at 8 feet/second) and a fast draw roll (moving the film at 56 feet/second). All of the samples in Example 1 were stretched or drawn down to approximately 5 mils which was approximately 22 percent of the original thickness of the film as it was extruded onto the casting roll. The stretched uniaxially oriented film was then cured (or annealed) by applying heat to the tensioned film stock at an annealing roll. The annealing roll was maintained at a temperature of 127° C. The film was then passed onto a chill roll maintained at a temperature of 49° C.

The samples all ranged in thickness from approximately 3.8 to 5.3 mils. Table II. shows the opacity, and elongation to break of these samples. The opacity was measured using the Tappi T 425 os-75 standard for measuring the opacity of paper which is an accepted procedure in the label industry. The elongation at break was measured using ASTM Standard D882 for measuring the mechanical properties of polymer films. The results of the opacity measurements range from approximately 60 to 97 percent and show that films with unexpectedly high opacities can be produced by uniaxial orientation of these films to create the voided structure.

TABLE II

Physical Measurements of the Films

| Examples | Thickness (mils) | Opacity (%) | Elongation (%) MD | CD |
|---|---|---|---|---|
| 1 | 4.70 | 93.0 | 18 | 83 |
| 2 | 4.84 | 93.2 | 18 | 55 |
| 3 | 4.24 | 88.4 | 20 | 70 |
| 4 | 4.28 | 85.5 | 20 | 280 |
| 5 | 4.26 | 86.7 | 22 | 290 |
| 6 | 4.12 | 82.2 | 23 | 210 |
| 7 | 4.70 | 92.6 | 20 | 68 |

TABLE II-continued

Physical Measurements of the Films

| Examples | Thickness (mils) | Opacity (%) | Elongation (%) MD | Elongation (%) CD |
|---|---|---|---|---|
| 8 | 4.72 | 90.6 | 21 | 85 |
| 9 | 4.30 | 81.0 | 21 | 270 |
| 10 | 3.84 | 61.2 | 20 | 280 |
| 11 | 4.60 | 87.0 | 22 | 400 |
| 12 | 5.74 | 96.9 | 18 | 86 |
| 13 | 5.30 | 95.6 | 19 | 79 |
| 14 | 4.70 | 92.0 | | |
| 15 | 5.00 | 94.3 | | |
| 16 | 5.30 | 95.7 | | |
| 17 | 4.20 | 83.7 | | |
| 18 | 4.10 | 84.9 | | |

Table II and III show the mechanical properties of the films which are indicative of the degree of orientation. The Gurley values for stiffness were measure using TAPPI test method T543PM-84 and all normalized for 4 mil films. The modulus and tensile strength were measured using ASTM test method D882. The elongation, Gurley stiffness, modulus and tensile strength all indicate that these sample were uniaxially oriented. Further, the Gurley stiffness of the voided films were unexpectedly higher than the Gurley stiffness of similar unvoided films.

TABLE III

Physical Measurements of the Films

| Examples | Gurley CD | Gurley MD | Modulus CD (×1000 psi) | Modulus MD (×1000 psi) | Tensile Strength CD (×1000 psi) | Tensile Strength MD (×1000 psi) |
|---|---|---|---|---|---|---|
| 1 | 27 | 101 | 69 | 381 | 2.1 | 27.4 |
| 2 | 24 | 91 | 63 | 375 | 2.1 | 27.3 |
| 3 | 36 | 121 | 89 | 446 | 2.5 | 32.6 |
| 4 | 37 | 115 | 98 | 418 | 2.9 | 30.9 |
| 5 | 35 | 110 | 92 | 427 | 2.6 | 33.1 |
| 6 | 38 | 109 | 109 | 397 | 2.7 | 34.1 |
| 7 | 30 | 106 | 80 | 376 | 2.1 | 28.3 |
| 8 | 29 | 98 | 75 | 356 | 2.1 | 30.3 |
| 9 | 33 | 106 | 94 | 376 | 2.4 | 31.9 |
| 10 | 34 | 92 | 79 | 329 | 2.4 | 30.4 |
| 11 | 31 | 88 | 81 | 341 | 2.2 | 27.8 |
| 12 | 20 | 82 | 45 | 278 | 1.4 | 19.3 |
| 13 | 23 | 92 | 59 | 307 | 1.7 | 22.3 |

Table IV shows the thermal conductivity of the in-mold films of the present invention, and the thermal conductivity of films currently being used for in-mold labelling. As is demonstrated, the in-mold films of the present invention provide a film a significantly lower thermal conductivity than those currently being used. The Primax® IM product described below is currently sold by Avery Dennison Corporation into the in-mold market. The Kimdura™ in-mold product is currently sold by Kimberly-Clark Corporation of Roswell, Ga. into the in-mold market. Measurements for these films were made with a Model C-400 Thermal Conductivity Cell, manufactured by the International Thermal Instrument Company of Del Mar, Calif. The samples were measured according to ASTM standard C 177-93.

TABLE IV

| Example[1] | Specimen Thickness[2] (mils) | Thermal Conductivity K-Cal/sec cm° C. | Thermal Conductivity K-Btu/ft hr° F. |
|---|---|---|---|
| 1 | 6 | $1.257 \times 10^{-4}$ | 0.0304 |
| 2 | 5 | $1.062 \times 10^{-4}$ | 0.0257 |
| 3 | 4 | $0.823 \times 10^{-4}$ | 0.0199 |
| 3 | 4 | $0.825 \times 10^{-4}$ | 0.0200 |
| 7 | 4.5 | $0.913 \times 10^{-4}$ | 0.0221 |
| 7 | 9 | $1.220 \times 10^{-4}$ | 0.0295 |
| 12 | 5.5 | $1.064 \times 10^{-4}$ | 0.0257 |
| 12 | 10.4 | $1.047 \times 10^{-4}$ | 0.0253 |
| 13 | 5.5 | $1.124 \times 10^{-4}$ | 0.0272 |
| 13 | 11.0 | $1.108 \times 10^{-4}$ | 0.0268 |
| Comparative Examples 19 and 20 | | | |
| Primax ® IM | 4 | $1.600 \times 10^{-4}$ | 0.0387 |
| Kimdura ™ | 4 | $1.273 \times 10^{-4}$ | 0.0308 |

Notes:
(1) Two specimens were measured for each film sample received.
(2) On some specimens we doubled the thickness in order to improve the accuracy of temperature difference measurement.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. An in-mold label film comprising at least two layers with one layer being a heat seal layer for bonding the film to a polymer substrate, said heat seal layer being activatable at a temperature between about 57° C. and about 100° C.; and the second layer being an insulating layer, said insulating layer comprising a strata of voids and non-spherical void initiating particles;

wherein the film has a thermal conductivity of less than about $1.250 \times 10^{-4}$ k-Cal/sec cm ° C.

2. The in-mold label film in claim 1, wherein the overall film thickness is less than about 7 mils.

3. The in-mold label film in claim 1, wherein at least two layers are coextruded.

4. The in-mold label film of claim 1 wherein the film has a thermal conductivity of less than $1.2 \times 10^{-4}$ k Cal/sec cm ° C.

5. The in-mold label film of claim 1 wherein the film has a thermal conductivity of less than $1.108 \times 10^{-4}$ k Cal/sec cm ° C.

6. The in-mold label film of claim 1 wherein the film is uniaxially oriented.

7. An in-mold label film comprising a heat seal layer, said heat seal layer being activatable at a temperature between about 57° C. and about 100° C.;

a print layer, and a core comprising an insulating layer between the heat seal layer and the print layer, wherein said insulating layer comprises a strata of voids and non-spherical void initiating particles; and wherein the film has a thermal conductivity of less than about $1.25 \times 10^{-4}$ k-Cal/sec cm ° C.

8. The in-mold label film in claim 7, wherein the heat seal layer is activatable between from about 70 to about 100° C.

9. The in-mold label film in claim 7, wherein the overall film thickness is less than about 7 mils.

10. The in-mold label film in claim 7, wherein the heat seal layer, the core and the print layer are coextruded.

11. The in-mold label film in claim 7, wherein the film has at least one layer containing a strata of voids.

12. The in-mold label film of claim 7 wherein the film is uniaxially oriented.

13. An in-mold label film comprising: an insulating base layer and a heat seal layer on one surface of the base layer wherein the film is uniaxially or biaxially oriented, said heat seal layer being activatable at a temperature between about 57° C. and about 100° C., said insulating base layer comprising a strata of voids and non-spherical void initiating particles, the film having a thermal conductivity of less than about $1.25 \times 10^{-4}$ k-Cal/sec cm ° C.

14. The in-mold label of claim 13 wherein the film is uniaxially oriented.

15. The label of claim 14 wherein the voids are prepared from two phase incompatible system.

16. An in-mold labeling film comprising a heat seal layer, a print layer and a core comprising a voided, uniaxially or biaxially oriented layer between the heat seal layer and the print layer, wherein said voided layer comprises non-spherical void initiating particles and wherein said heat seal layer is activatable at a temperature between 57° and about 100° C., the film having a thermal conductivity of less than about $1.25 \times 10^{-4}$ k-Cal/sec cm ° C.

* * * * *